US006948362B2

(12) United States Patent
Gralenski

(10) Patent No.: US 6,948,362 B2
(45) Date of Patent: Sep. 27, 2005

(54) FLOW MEASUREMENT DEVICE

(76) Inventor: Nicholas M. Gralenski, 1797 Cheryl Way, Aptos, CA (US) 95003

( * ) Notice: Subject to any disclaimer, the term of this patent is extended or adjusted under 35 U.S.C. 154(b) by 73 days.

(21) Appl. No.: 10/619,683

(22) Filed: Jul. 15, 2003

(65) Prior Publication Data
US 2004/0134271 A1 Jul. 15, 2004

Related U.S. Application Data
(60) Provisional application No. 60/396,216, filed on Jul. 16, 2002.

(51) Int. Cl.[7] .............................. G01F 1/68; G01K 17/06
(52) U.S. Cl. ...................................... 73/204.23; 374/39
(58) Field of Search .............................. 73/861.04, 198, 73/200–202.5, 204.11, 204.13, 204.16, 204.21, 204.22, 204.23; 374/39–40; 62/7

(56) References Cited
U.S. PATENT DOCUMENTS
4,932,788 A * 6/1990 Yeh .......................... 73/861.04
5,598,709 A * 2/1997 Viegas et al. ................. 62/50.2

* cited by examiner

Primary Examiner—Edward Lefkowitz
Assistant Examiner—Takisha Miller
(74) Attorney, Agent, or Firm—Woodside IP Group; Michael Hetherington; Morrison Ulman

(57) ABSTRACT

An improved flow measurement device is provided in a flow path for direct measurement of flow. An internal heat source solves the problem of heat transfer in conventional mass flow meters. The heat transfer associated with the internal heater forms the basis of flow measurement, and improved accuracy is achieved. The flow measurement device advantageously eliminates the introduction of inaccuracies, bypass errors, or inaccurate assumptions that are inherent in a conventional bypass structure. The present measurement device eliminates the need for one or more bubblers and thus overcomes bubbler pressure sensitivity and the bubbler requirement for exact (and unstable) gas vapor saturation of conventional flow measurement. The flow measurement device works equally well with gases, liquids or mixtures of gases and liquids and provides greater control over flow rates with very high degree of precision.

4 Claims, 3 Drawing Sheets

FLOW MEASUREMENT DEVICE

RELATED APPLICATION

This application is based on U.S. provisional patent application Ser. No. 60/396,216 entitled, Flow Measurement Device filed Jul. 16, 2002.

BACKGROUND

1. Field of the Invention

The field of the invention generally relates to techniques for precisely measuring the flow rates of gases and liquids and mixtures thereof. In particular, the field of the invention relates to a flow measurement device positioned in a flow path for measuring liquids and gases, or a mixture thereof that achieves a previously unattainable degree of precision. Positioning of the flow measurement device in the flow path eliminates the complexity and inaccuracies inherent in a conventional bypass structure and enables precise real time control of process parameters.

2. Background of Related Art

Accurate flow rates of gases and liquids are of wide-ranging interest in our economy. In particular, as semiconductor feature sizes shrink to atomic scales, it is essential that mass flow parameters be maintained with tighter control than was previously possible. Sophisticated applications are common in semiconductor manufacturing, pharmaceuticals and optics among other areas of commerce. Small process variations, too small to be accommodated by conventional mass flow devices, can result in unacceptable process variations when feature sizes are measured with respect to nanometers.

Two concepts are commonly in use for sophisticated applications requiring precise mass flow rates. These two concepts are commonly referred to as "bypass or capillary" mass flow meters (MFM) and "bubbler" mass flow metering devices. Although there are a number of variations of these conventional mass flow meters, they all share a number of problems and limitations. These problems and limitations include, inherent inaccuracies, inherent process variations, maintenance difficulties, cleaning difficulties and inefficient size.

the conventional "bypass or capillary" MFM (FIG. 1) makes use of the change in a temperature differential caused by mass flow through the bypass structure. Typical conventional MFM's of this design are disclosed in U.S. Pat. No. 2,729,976 (Laub), U.S. Pat. No. 3,938,384 (Blair) and U.S. Pat. No. 4,487,062 (Olin). When the temperature differential (Temperature, $T_2$ greater than Temperature $T_1$) is measured by electronic temperature sensors, the flow signal becomes an electrical signal that is highly useful for automated process control. The MFM can be small, accurate and minimally contaminating to the process of interest.

However, the conventional "bypass or capillary" MFM has subtle limitations that increasingly limit its suitability for sophisticated processing. Heat transfer within the sensor itself changes due to many factors, such as intimacy of the heating element bond to electrical insulation, electrical insulation bond to capillary, heat transfer through capillary wall, deposits built up inside capillary, and heat transfer from edge to the center of capillary flow. These changes in heat transfer characteristics affect the correlation between heater energy and temperature differential and reduce the precision of the MFM.

The capillary part of this traditional MFM is a very small flow tube intended to minimize temperature difference from an edge to the center of flow. Such temperature difference is undesirable because it introduces an uncertainty in the amount of fluid being heated and thus an uncertainty in the amount of fluid flow. Typically, only a small portion of the total flow passes through the capillary. Thus, a large portion of the flow must pass through a calibrated by-pass without contributing to the flow measurement at all. An assumption must be made that flow proportions through the capillary and by-pass stay the same regardless of fluid composition, process temperature, process pressure and overall process flow rates. This assumption introduces an inherent inaccuracy into all "bypass or capillary" MFMs.

The above limitations apply to gaseous flow. For liquid flow, additional complications impose limitations on the accuracy of conventional methods of mass flow measurement. Bubbling, voiding or boiling can occur as the liquid passes through the capillary. This can result from increases in temperature associated with heating by the heater, pressure drops and directional changes, among other reasons, as the fluid passes into and through the capillary. These effects can result in a change in phase of liquid to vapor or the emergence of dissolved gases from the fluid. The introduction of two phases into the capillary significantly and unpredictably alters the correlation between heater energy and temperature differential. Under these circumstances, the flow signals become totally unreliable.

Because of conventional MFM difficulties in handling liquids, bubblers (FIG. 2) are sometimes used as an alternative means of metering mass flow rates. Typical conventional bubbler designs are disclosed in U.S. Pat. No. 4,134,514 (Schumacher), U.S. Pat. No. 4,140,735 (Schumacher) and U.S. Pat. No. 4,436,674 (McMenamin). Sophisticated applications require the use of gaseous ingredients to achieve the precise mass flow rates necessary in applications where atomic scales are important. Therefore, a mass flow metering device (bubbler) starting with a liquid ingredient requires a change of state; i.e. controlled evaporation to a gaseous state. The amount of liquid used is frequently very small which makes accurate measurement difficult. When the liquid is converted to a gas, a volume expansion of about 1000 times occurs which then makes measurement easier.

A bubbler, (FIG. 2) is a container of liquid kept at a fixed temperature by the heater (with appropriate controls, enclosures, etc.). An inlet gas bubbles into the liquid, mixing with evaporant. Above the liquid level, the proportion of gas to evaporant is directly related to the liquid temperature and the container pressure. If container pressure surges higher, the evaporant proportion will be reduced. If container temperature is slightly cooler at the top, condensation will occur, also lowering evaporant proportion. If bubbling action is too vigorous, atomization can occur, producing aerosols that represent increased proportion. The liquid level must be kept constant or the thermal and evaporative characteristics of the bubbler change.

To keep a constant level as evaporation removes liquid, a level sensor must be provided. The level sensor signals additional liquid delivery through the refill port. Of course, the refill liquid must be the same temperature or the bubbler characteristics will change. If all goes well, a specific concentration of evaporant in inlet gas passes through the outlet to the process area. The outlet region must be kept sufficiently hot or condensation will occur, lowering evaporant concentration.

Obviously, accurate control of a bubbler is no simple task. For some processes, several liquids may be required. Each liquid requires its own bubbler. Even if the liquids can be freely mixed without altering their properties, the bubbling process constitutes distillation. Evaporation would distort the liquid proportions unless all liquids had exactly the same evaporation characteristics.

Fluid flow measurement is becoming critical to increasing operational efficiency of many commercial processes, such as in semiconductor process control. As semiconductor device feature sizes shrink to atomic dimensions, improved in line process measurements that do not introduce inaccuracies or assumptions are needed to control fluid flow. Therefore, what is needed is a new method for directly measuring fluid flow that provides precise in situ measurement of fluid flow rate for enabling real time control of process parameters without error.

SUMMARY

In accordance with the foregoing and other objectives, an aspect of the invention provides a flow measurement device that works equally well with gases, liquids or mixtures of gases and liquids. Another aspect of the invention provides greater control over flow rates with very high degree of precision. This is due to the fact that the measurement device eliminates the need for one or more bubblers. Accordingly, this eliminates bubbler pressure sensitivity and the bubbler requirement for exact (and unstable) gas vapor saturation.

An aspect of the present invention also eliminates the need for a capillary or bypass structure. Since the present measurement device is provided in the flowpath for direct measurement of flow, it advantageously eliminates the introduction of inaccuracies, bypass errors or inaccurate assumptions inherent in a conventional bypass structure.

Another aspect of the invention provides an internal electric heat source. Because the heat source is internal, the invention does not suffer from any of the heat transfer problems associated with conventional mass flow meters. Since the heat transfer associated with the heater forms the basis of flow measurement, improved accuracy is achieved.

DETAILED DESCRIPTION

Figure 3:
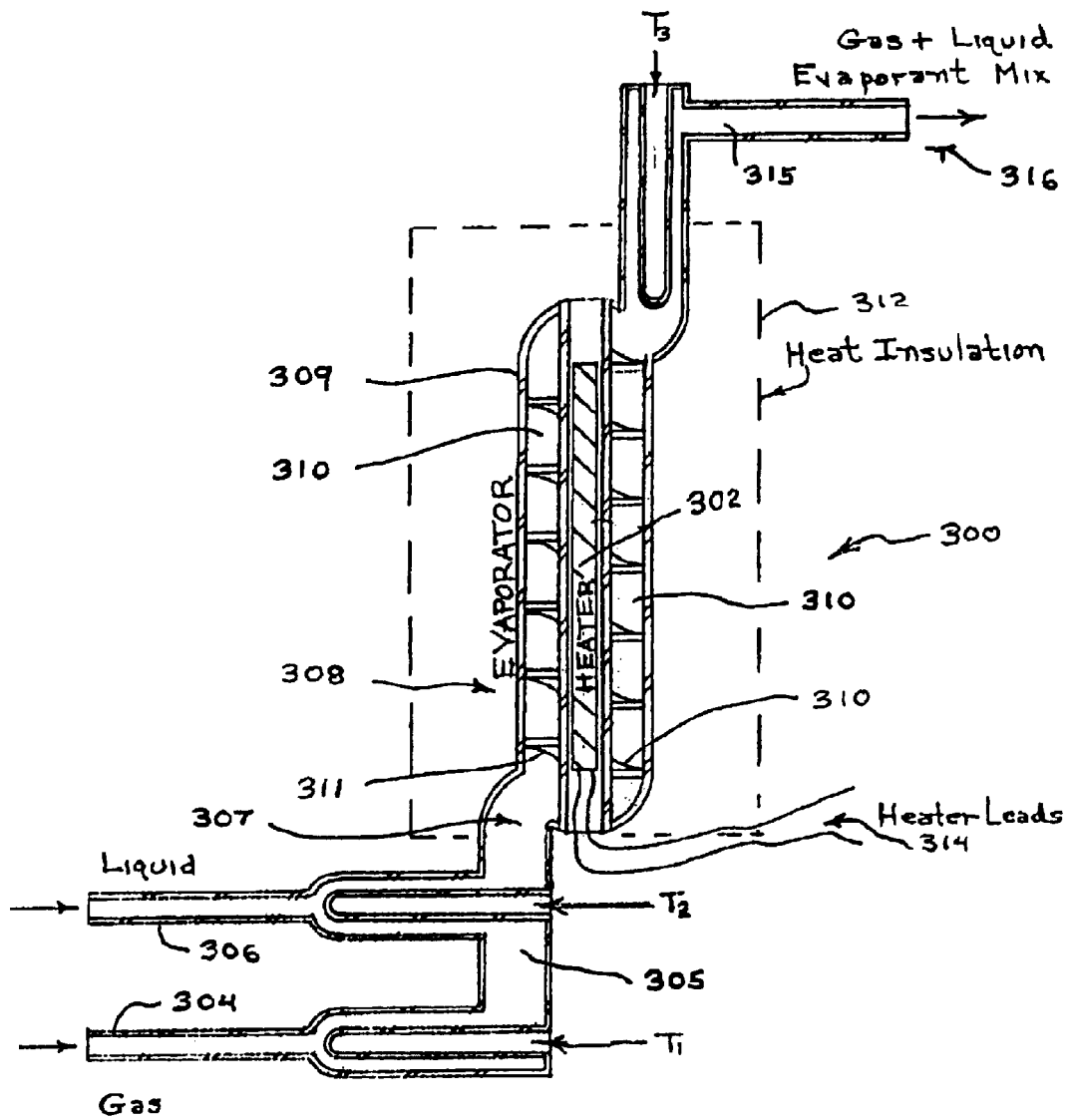
FIG. 3 shows a flow measurement device capable of measuring gases, liquids, or mixes thereof according to the present invention.

Referring to FIG. 3, a new type of flow measurement device is provided that achieves improved measurement of gases, liquids, or mixtures thereof. When coupled with valves or other flow regulating equipment, the flow measurement device becomes a highly precise flow-metering device.

Figure 1:
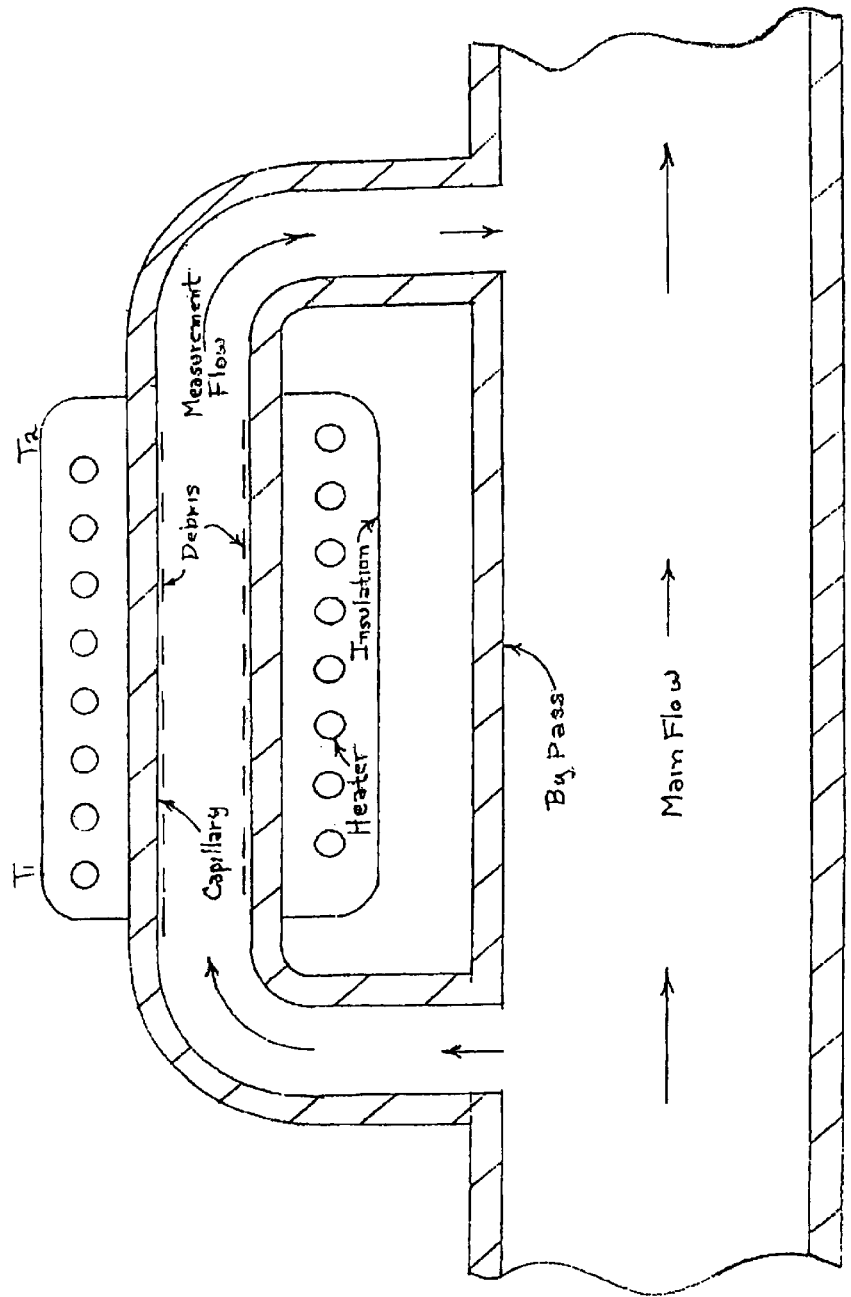
FIG. 1 shows a conventional mass flow meter (MFM) including a capillary and bypass structure.

Heat flow always requires a temperature difference. In FIG. 1, temperature $T_1$ and $T_2$, used for measurement, are not in the flow path. It can be expected that temperatures, in the flow path, will be different than $T_1$ and $T_2$, thus constituting an error. The capillary of FIG. 1 is a structural feature which minimizes this error, but then can only measure a small portion of the total flow. The capillary feature is more vulnerable to calibration changes caused by a change in heat flow characteristics from $T_1$ or $T_2$ to the total flow path. Debris is one such change. The intimacy of thermal contact between heater, insulation and capillary wall are other changes. These uncertainties are magnified when measuring liquids which degas and boil with severe disruption in heat transfer.

In contrast, the design concept of FIG. 3 eliminates these uncertainties, enabling the effective measurement of gases, liquids or mixtures thereof.

The flow measurement device 300 comprises an evaporator 308, which may be a generally tubular structure. A cross section of the evaporator including the coaxial internal heater 302 is shown.

In operation, gas and liquid enter through gas and liquid lines 304 and 306, respectively. Gas and liquid lines 304 and 306 define flow paths as indicated by arrows. Flow rate of the gas is assumed known (measured by any convenient device). The measurement can take place upstream in the flow paths prior to entering the flow measurement device 300. Temperature of gas and liquid are measured by convenient devices giving temperatures at $T_1$ and $T_2$, respectively, located in the flow paths. The location where gas flow mixes with the liquid is chosen to ensure mixing of the gas and liquid phases and avoid phase stratification. This mixture enters the evaporator through a plenum or inlet at 307. The evaporator 308 comprises the evaporator housing or shell 309, a spiral channel 310 and heater 302. Channel 310 comprises a single flow path defined by the longitudinal axis of the evaporator. The spiral channel is created by a series of diversion fins 311 which provide a means for inducing a spiral or helical flow path. The helical flow path ensures that unsuspected aerosols do not flow through the device without being heated.

The liquid in line 306 can be a mixture. Since all of the liquid is being evaporated by evaporator 308, it doesn't matter if the components have different boiling points. Temperature at measurement point $T_3$ is located directly in the flow path of the gas and liquid evaporant mix as it exits the evaporator 308. However, measurement point $T_3$ should be adjusted in operation to be above the boiling point of any component flowing into the device to be sure it is evaporated. Heat insulation 312 is disposed around the evaporator and heater. The heat insulation 312 serves to make sure that the only heat entering or leaving the system comes from the heater 302, which is monitored electronically through heater leads 314.

When the composition and proportions of the liquid are defined for the specific application, the specific heats and heats of vaporization to change them from $T_2$ to $T_3$ can be determined from physical property information sources. Given these compositions, proportions and physical properties, there is a precise thermal energy input from the heater (measured from heater leads 314) necessary to increase the temperature to $T_3$ from an initial temperature of $T_2$. This precise thermal energy input is also directly related to liquid flow. Because thermal energy, $T_3$ and $T_2$ are measured, the liquid flow can be precisely determined based on a simple yet precise energy balance. Similarly, the gas flow (known) also will require a definite corresponding heat flow to raise temperature to $T_3$ from $T_1$ as a specified mass flow rate. The gas will not undergo a phase change; therefore heat of vaporization is not relevant.

Therefore, a precise mass flow rate measurement can be determined from the physical properties, measurement of heater energy and measurement of temperatures at $T_3$ and $T_2$. These flows, brought to temperature $T_3$ by a measured heat flow constitute a liquid flow rate measurement. If the heat input is kept constant, $T_3$ will change in proportion to gas and liquid flow also. However, because a change of state is involved, it would seem better to fix $T_3$ approximately above boiling and to vary heater power.

Thus, in an actual process, $T_3$ is chosen to suit the liquid used. The desired process will require a certain gas and liquid flow. Valves or other flow regulating equipment in the gas line sets this flow. Valves or other flow regulating equipment in the liquid line also sets the flow and is adjusted continuously from electronic readings to maintain desired process conditions.

WORKING EXAMPLE

When the device of FIG. 3 is used in its simplest form (measuring gas flow only), the electrical power required (E) is equal to the product of specific heat (S.H.) times the temperature change produced by the device ($\Delta T$) times the gas flow rate (G)
Or:

$$E \text{ (Watts)} = \text{S.H. (Joules per gram per } °\text{ C.)} \times$$
$$\Delta T \text{ (}° \text{ Centigrade)} \times$$
$$G \text{ (Grams per second)}$$

Or:

$$E = S.H. \times \Delta T \times G$$

For argon gas (commonly used), SH=0.523
Any $\Delta T$ can be chosen which doesn't damage apparatus or gas. A convenient $\Delta T$ may be 85° C.
In that case, $$E=0.523 \times 85 \times G = 44.455 G$$

Or, $G=0.0225E$

Thus, measurement of the input wattage is a direct indication of the gas flow. It may be more convenient to select an output temperature before hand as part of the process. The selection would be based on one not damaging to apparatus or gas, maximization of measurement signal, minimization of delivery tube heating etc. While such selection sounds complicated, it is instead a means of optimizing process conditions to reduce complications.

In that case, $$E=0.523(T_3-T_1)\times G$$

If $T_3=85°$ C., and $T_1=25°$ C., and the desired process gas flow is 0.0545 grams per second of argon, $$E = 0.523 (85-25) \times 0.0545$$
$$= 1.71 \text{ watts}$$

The volume of the argon flow depends on temperature and pressure. At 25° C. and atmospheric pressure, 0.0545 grams per second represents 2.0 liters of gas per minute.

Now suppose a liquid is also included in the flow. The liquid, in addition, is to be converted (evaporated or vaporized) to a gas. Typically, the intention is to deliver the liquid in gaseous form to the process area. This means that, after evaporation, conditions must be maintained to avoid condensation. All liquids have strict physical properties that govern their transition to gases and also re-condensation.

If the liquid is water, for example, it will evaporate or condense in accordance with its fundamental vapor pressure properties. To evaporate water, it is not necessary to "boil" it. The air we breathe contains water which is obviously not "boiling" (100° C.) and which is indicated by humidity and dew-point references. The term "boiling point" means the temperature at which surrounding air, at atmospheric pressure, can be 100% replaced by gaseous water. The boiling point of water (or any other liquid) is thus the temperature at which the vapor pressure equals the ambient pressure.

The above measurement temperature, $T_3$, will indicate the maximum water concentration, or vapor pressure, leaving the outlet 316 in FIG. 3. As mentioned, $T_3$ can be whatever temperature is suited to the purpose intended. If $T_3$ is 85°, the vapor pressure of water at this temperature is 433.6 millimeters of mercury (mm Hg). If the pressure in the flow channel 315 is at atmospheric (760 mm Hg), this means the maximum concentration of water vapor in the outlet 316 of FIG. 3 is:

$$\frac{433.6}{760} = 0.571 = 57.1\%$$

If the pressure in the flow channel 315 is regulated to 433.6 mmHg, the water vapor content can now be 100%. However, this would be equivalent to 100% humidity, meaning condensation would occur at the slightest provocation. Process control may well dictate that 90% vapor pressure (390.24 mmHg) be a practical maximum to stay away from unstable conditions. In that case, the water vapor in the outlet of FIG. 3 is either 100% at a pressure of 390.24 mm Hg or 51.3%

$$\left(\frac{390.24}{760} \times 100 = 51.3\%\right)$$

at atmospheric pressure, mixed with argon. The argon is serving as a "carrier gas". Evaporated liquid vapors always have limitations regarding temperature and pressure. Adding a non-condensable inert gas like argon allows choice of pressure and temperature without violating vapor pressure limitations.

At 85° C., and 760 mm Hg, the density of argon gas is 1.360 grams per liter (gm/l). At the same conditions, water vapor density is 0.6135 gm/l. If the argon process gas flow chosen is 0.0545 grams per second, this corresponds to 0.040 liters per second (2.40 liters per minute) at 85° C. and 760 mm Hg. The designated 51.3% water vapor in the outlet flow is by volume, not by weight. The argon is thus 48.7% of the total, at 0.040 liters per second, and the water is 0.042 liters per second or 0.0258 grams per second (1.55 grams per minute).

A typical process can be one cubic centimeter of liquid water per minute (one gram per minute) which would be 0.017 grams per second (0.027 liters per second). In that case the mixture leaving the outlet 316 of FIG. 3 is 40.3% water vapor which is even less likely to have condensation instability problems than the 51.3% maximum mentioned earlier.

The electrical power, which is an indication of these desired flows, can now be determined. The water is heated from $T_2$ to $T_3$. The specific heat of water is 4.186 Joules per gram per degree C. Evaporation of the water involves heat of vaporization, which for water at 85° C., is 2294.3 Joules per gram. Thus the energies involved are:

| | | |
|---|---|---|
| Argon: | $E_1 = 0.523\ (85-T_1) \times .0545 =$ | 1.7 watts ($T_1 = 25°$ C.) |
| Water: | $E_2 = 4.186\ (85-T_2) \times .017 =$ | 4.27 watts ($T_2 = 25°$ C.) |
| | $E_3 = 2294.3 \times .017 =$ | 39.0 watts |
| | Total: | 44.97 watts |

Therefore, a measurement of 44.97 watts indicates a flow of 0.017 gm per second of water and 0.0545 gm per second of argon.

The numerous subtle details described are due to process and materials, and not due to the complexity of the device of FIG. 3. Traditional flow measurement techniques frequently have difficulty keeping up with these subtleties for optimal process control.

The device of FIG. 3 is a comparatively simple and cost-effective way to cope with the complexities of modern day processing.

The above example illustrates argon and water. But gas mixtures and liquid mixtures can also be measured and fully vaporized to serve the needs of modern industry.

Figure 2:
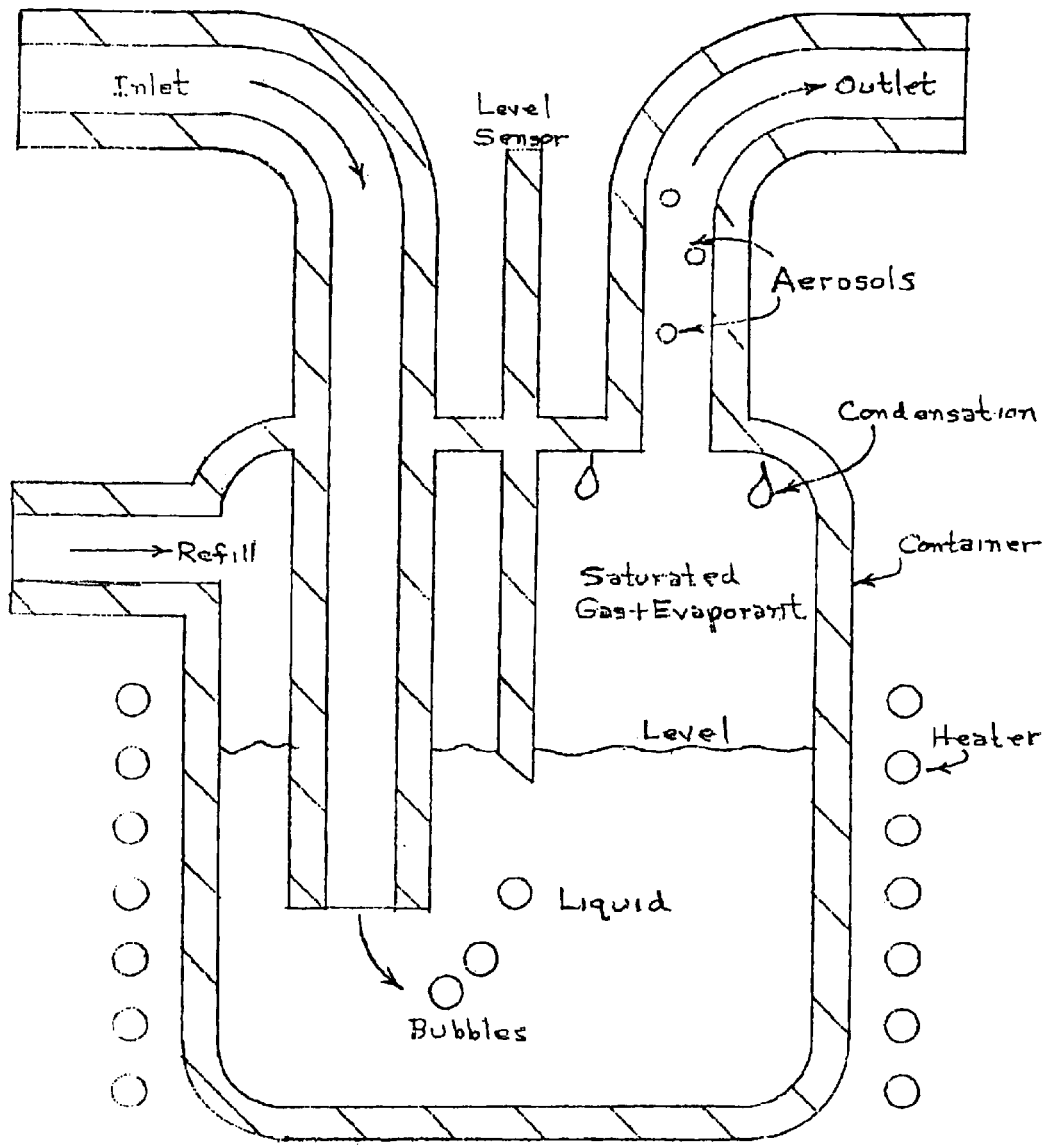
FIG. 2 shows a conventional MFM including a bubbler.

The flow measurement system of FIG. 3 has numerous advantages over conventional methods of mass flow measurement shown in FIG. 1 and FIG. 2 as follows.

1. It works with gases or liquids.
2. It works with mixed liquids.
3. It's much simpler than one or multiple bubblers.
4. It's much smaller than bubblers.
5. The internal coaxial heat source keeps much better track of the thermal effects that are the basis of the flow measurement.
6. Without capillary or bypass, all fluid flow is measured, thus eliminating by-pass errors.
7. Temperature measurement is internal for improved accuracy.
8. The bubbler pressure sensitivity is eliminated.
9. The bubbler requirement for exact (and unstable) gas-vapor saturation is eliminated.
10. Temperature controlled refill is eliminated.

While the invention has been described in connection with what are presently considered to be the most practical and preferred embodiments, it is to be understood that the invention is not limited to the disclosed embodiments, but rather is intended to cover various modifications and equivalent arrangements which are included within the spirit and scope of the following claims.

I claim:

1. A mass flow measuring device comprising:

an evaporator having a housing defining a flow path and an outlet for discharging a gas and liquid evaporant mix along the flow path;

an inlet plenum communicating with the evaporator for receiving inlet gases, liquids or a mixture of gases and liquids flowing along respective inlet flow paths, an electric heater means for heating the inlet gases, liquids and gas liquid mixtures within the evaporator flow path;

electric sensor means connected to the electric heater means for measuring heater energy consumption;

temperature sensor means provided in the middle of respective inlet flow paths for directly measuring temperatures of the inlet gases, liquids and mixtures, and temperature sensor means provided centrally in the outlet flow path for directly measuring the temperature of the discharged gas and liquid evaporant mix;

such that mass flow is measured based on precise determination of energy absorbed, inlet flow rates, and inlet and outlet temperatures.

2. A mass flow-measuring device according to claim 1 further comprising:

electric heater means provided in the flow path of the evaporator, coaxially with respect to the evaporator housing, for heating gases, liquids and gas liquid mixtures in the flow path.

3. A mass flow-measuring device according to claim 1 further comprising:

one or more diversion fins provided in the evaporator housing for inducing a spiral or helical flow of liquids or a mixture of gases and liquids flowing in the flow path through the evaporator.

4. A mass flow measuring device for direct measurement of flow comprising:

an evaporator defining a flow path, without a capillary or bypass structure, for the entirety of a flow under measurement, an inlet plenum communicating with the evaporator for receiving inlet gases, liquids, or a mixture of gases and liquids flowing along respective inlet flow paths, and;

electric heater means provided coaxially in the evaporator flow path for heating gases, liquids and gas liquid mixtures passing through the evaporator;

an outlet for discharging a heated gas and liquid evaporant mix;

an electric sensor means connected to the electric heater means for measuring heater energy consumption with respect to a predetermined amount of gas and liquid evaporant mix;

temperature sensor means provided centrally in the respective inlet flow paths for directly measuring temperatures of the corresponding amount of inlet gases, liquids and mixtures, and temperature sensor means provided centrally in the outlet for directly measuring the temperature of the discharged gas and liquid evaporant mix; and for determining mass flow based on precise measurement of inlet flow rates, in let and outlet temperatures and energy absorbed during heating.

* * * * *